(12) United States Patent
Pelliconi et al.

(10) Patent No.: US 7,288,598 B2
(45) Date of Patent: Oct. 30, 2007

(54) POLYOLEFIN MASTERBATCH FOR PREPARING IMPACT-RESISTANT POLYOLEFIN ARTICLES

(75) Inventors: Anteo Pelliconi, S. M. Maddalena (IT); Enea Garagnani, Ferrara (IT); Yutaka Yokoyama, Kawasaky (JP); Junichiro Washiyama, Yokohama (JP); Hiroshi Takenouchi, Kanagawa (JP); Takeshi Nakajima, Tokyo (JP)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/506,950

(22) PCT Filed: Mar. 6, 2003

(86) PCT No.: PCT/EP03/02518

§ 371 (c)(1),
(2), (4) Date: Sep. 8, 2004

(87) PCT Pub. No.: WO03/076511

PCT Pub. Date: Sep. 18, 2003

(65) Prior Publication Data

US 2005/0113521 A1 May 26, 2005

(51) Int. Cl.
*C08F 10/02* (2006.01)

(52) U.S. Cl. .............. 525/240; 526/348.6; 526/348; 526/351; 526/127

(58) Field of Classification Search ............ 525/240; 526/348.6, 351, 348, 127
See application file for complete search history.

(56) References Cited

U.S. PATENT DOCUMENTS

| | | | |
|---|---|---|---|
| 4,399,054 A | 8/1983 | Ferraris et al. ......... | 252/429 B |
| 5,145,819 A | 9/1992 | Winter et al. ........... | 502/117 |
| 5,324,800 A | 6/1994 | Welborn, Jr. et al. ...... | 526/160 |
| 6,048,942 A * | 4/2000 | Buehler et al. .......... | 525/240 |

FOREIGN PATENT DOCUMENTS

| | | |
|---|---|---|
| EP | 0045977 | 2/1982 |
| EP | 0129368 | 12/1984 |
| EP | 0361493 | 4/1990 |
| EP | 0416815 | 3/1991 |
| EP | 0420436 | 4/1991 |
| EP | 0485823 | 5/1992 |
| EP | 0640649 | 3/1995 |
| EP | 0643066 | 3/1995 |
| EP | 0671404 | 9/1995 |
| EP | 0674991 | 10/1995 |
| EP | 0704463 | 4/1996 |
| EP | 0728769 | 8/1996 |
| EP | 0832925 | 4/1998 |
| EP | 0884353 | 12/1998 |
| EP | 0 640 649 B1 * | 3/1999 |
| WO | 9104257 | 4/1991 |

* cited by examiner

*Primary Examiner*—Robert D. Harlan
(74) *Attorney, Agent, or Firm*—Jarrod N Raphael

(57) ABSTRACT

A masterbatch composition comprising (1) 10-50 wt % of a crystalline propylene homopolymer and (2) 50-90 wt % of a blend consisting of (a) a copolymer of ethylene and one or more C4-CIO a-olefin(s), containing 10-40 of C4-CIO a-olefin(s), and (b) an amorphous copolymer of propylene and ethylene. Copolymer (b) has an ethylene content from 20-70 wt %, and an intrinsic viscosity value of the xylene-soluble moiety of from 2.2 to 3.5 d/Lg, this value being equal to 0.8 to 1.2 times the intrinsic viscosity value of the xylene-soluble moiety of copolymer (a). The weight ratio of copolymers (a)/(b) is from 3/1 to 1/3. Polyolefin compositions comprising the said masterbatch composition are suitable for the manufacture of automotive parts.

13 Claims, No Drawings

POLYOLEFIN MASTERBATCH FOR PREPARING IMPACT-RESISTANT POLYOLEFIN ARTICLES

This application is the U.S. national stage of International Application PCT/EP03/02518, filed Mar. 6, 2003.

The present invention relates to a polyolefin masterbatch that can be used to prepare a polyolefin composition suitable for molding into relatively large articles.

Polypropylene and thermoplastic polyolefins have enjoyed wide commercial acceptance because of their outstanding cost/performance characteristics.

Polypropylene and thermoplastic polyolefins are generally injection molded into desired articles.

Polyolefin composition possessing good characteristics in terms of a balance of flexural modulus and Izod impact strength are known. Such compositions, which are described in European patent application 640649, for example, can comprise a crystalline propylene polymer, an ethylene-propylene copolymer rubber, and ethylene-$C_3$-$C_8$ α-olefin copolymer rubber. The described compositions have, however, an unsatisfactory value of coefficient of linear thermal expansion (CLTE) and balance of values between flexural modulus and Izod impact resistance.

The polyolefin composition prepared by using the masterbatch of the present invention can be injection molded into large objects which exhibit an improved balance of mechanical properties, in particular of flexural modulus and Izod impact strength even at low temperatures (e.g. at −30° C.).

In addition to the above properties, the polyolefin composition is endowed with satisfactory optical properties, in particular gloss. As required by the market, the composition of the present invention shows low gloss values.

An added advantage is that the said composition has a low value of CLTE. Said property imparts a higher dimensional stability to the final molded articles.

Thanks to the said properties, the polyolefin compositions comprising the masterbatch compositions of the present invention are, therefore, particularly suitable for the manufacture of automotive parts, in particular bumpers and side strips.

Therefore the present invention relates to a masterbatch composition comprising (percent by weight):

1) 10-50%, preferably 20-40%, of a crystalline propylene homopolymer; and
2) 50-90%, preferably 60-80% of a blend consisting of:
   (a) a copolymer of ethylene and one or more α-olefin(s) of formula $H_2C=CHR$, where R is a $C_2$-$C_8$ linear or branched alkyl radical, and containing 10-40, preferably 12-35% of said $C_4$-$C_{10}$ α-olefin(s) (copolymer (a)), and
   (b) an amorphous copolymer of propylene and ethylene (copolymer (b)), wherein the ethylene content is from 20-70%, preferably 30-60%, and having an intrinsic viscosity value of the xylene-soluble moiety of from 2.2 to 3.5 dL/g, this value being equal to 0.8 to 1.2 times the intrinsic viscosity value of the xylene-soluble moiety of copolymer (a);

wherein the weight ratio between copolymer (a) and copolymer (b) is from 3/1 to 1/3, preferably from 2/1 to 1/2.

The solubility in xylene is determined at ambient temperature, that is approximately 25° C. The method for determining the solubility in xylene is disclosed hereinafter.

From the above definitions it is evident that the term "copolymer" includes polymers containing more than two types of monomers.

The said $C_4$-$C_{10}$ alpha olefins that can be straight or branched are preferably selected from 1-butene, 1-pentene, 1-hexene, 4-methyl-1-pentene and 1-octene. Particularly preferred is 1-butene.

The crystalline propylene homopolymer is generally a homopolymer soluble in xylene at ambient temperature for a percentage lower than 6% by weight, preferably lower than 4, more preferably lower than or equal to 3% by weight.

Typically, copolymer (a) has a ratio of weight average molecular weight to number average molecular weight, namely $\overline{Mw}/\overline{Mn}$, equal to or over 4. It is typically soluble in xylene at ambient temperature in a percent ranging from 30 to 80%, preferably from 40 to 70% by weight.

Typically, copolymer (b) has an ethylene content from over 35 to 60% by weight. The intrinsic viscosity value of the xylene-soluble moiety of copolymer (b) is typically from 2.4 to 3.5 dL/g.

If the value of intrinsic viscosity of copolymer (a) and/or copolymer (b) is lower than the selected values, the polyolefin masterbatch shows unwanted streaks.

Preferably the Melt Flow Rate (MFR) values for the masterbatch composition of the present invention range from 0.5 to 15 g/10 min., more preferably from 1 to 10 g/10 min.

Typically, the masterbatch of the present invention has a value of flexural modulus equal to or lower than 700 MPa, generally ranging from 100 to 500 MPa; an Izod impact value at −30° C. over 30 kJ/m$^2$; and a value of CLTE equal to or lower than $10.5 \cdot 10^{-5\circ}$ C.$^{-1}$.

The said MFR values can be obtained directly in polymerization, by properly dosing the molecular weight regulator (hydrogen), or by degradation, in particular in the presence of free radical initiators, like organic peroxides, operating with techniques well known in the art.

The polyolefin compositions prepared by mixing the masterbatch of the present invention with additional polyolefins show, as previously said, a very unique balance of properties, which is not achievable by using the masterbatch compositions of the existing art, as will be shown in the examples.

The masterbatch composition of the present invention can be prepared by a sequential polymerization, comprising at least three sequential steps, wherein components (1) and (2) are prepared in separate subsequent steps, operating in each step, except the first step, in the presence of the polymer formed and the catalyst used in the preceding step. The catalyst is only added in the first step, however its activity is such that it is still active for all the subsequent steps.

In particular, component (2) requires two sequential steps, one for preparing copolymer (a) and the other for preparing copolymer (b).

Preferably component (1) is prepared before component (2).

The order in which copolymers (a) and (b), constituting component (2), are prepared is not critical.

The polymerization, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the two steps are not critical, however it is best if the temperature is from 50 to 100° C. The pressure can be atmospheric or higher. The regulation of the molecular weight is carried out by using known regulators, hydrogen in particular.

Such polymerization is preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an isotactic index greater than 90%, preferably greater than 95%. Catalysts having the above mentioned characteristics are well known in the patent literature; particularly advantageous are the catalysts described in U.S. Pat. No. 4,399,054 and European patent 45977.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

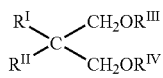

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl)fluorene.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert\text{-}butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$. 1,3-diethers having the formulae described above can also be used advantageously. If the internal donor is one of these dieters, the external donors can be omitted.

The catalysts can be pre-contacted with small amounts of olefins (prepolymerization).

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the copolymers (a) and (b).

The masterbatch composition of the present invention can also contain additives commonly employed in the art, such as antioxidants, light stabilizers, heat stabilizers, colorants and fillers.

The masterbatch composition of the present invention can be compounded with additional polyolefins, in particular propylene polymers such as propylene homopolymers, random copolymers, and thermoplastic elastomeric polyolefin composition. Accordingly, a second embodiment of the invention relates to a thermoplastic polyolefin composition suitable for injection molding, containing the above-mentioned masterbatch compositions. Preferably, the said thermoplastic polyolefin composition comprises up to 60% by weight, typically from 10 to 45% by weight, of the masterbatch composition according the present invention. Practical examples of the above-mentioned polyolefins are the following polymers:

A. crystalline propylene homopolymers, in particular isotactic or mainly isotactic homopolymers;

B. crystalline propylene copolymers with ethylene and/or a $C_4$-$C_{10}$ α-olefin, wherein the total comonomer content ranges from 0.05 to 20% by weight with respect to the weight of the copolymer. Preferred α-olefins are 1-butene. 1-hexene., 4-methyl-1-pentene and 1-octene;

C. crystalline ethylene homopolymers and copolymers with ethylene and/or a $C_4$-$C_{10}$ α-olefin, such as HDPE;

D. elastomeric copolymers of ethylene with propylene and/or a $C_4$-$C_{10}$ α-olefin, optionally containing minor quantities of a diene, such as butadiene, 1,4-hexadiene, 1,5- hexadiene and ethylidene-1-nobornene. The diene content is typically from 1 to 10% by weight;

E. a thermoplastic elastomeric composition comprising a propylene homopolymer and/or one of the copolymers of item B and an elastomeric moiety comprising one or more of the copolymers of item D, typically prepared according to known methods by mixing the components in the molten state or by sequential polymerization and generally containing the said elastomeric moiety in quantities from 5 to 80% by weight.

The polyolefin composition may be manufactured by mixing the masterbatch composition and the additional polyolefin together, extruding the mixture, and pelletizing the resulting composition using known techniques and apparatus.

The polyolefin composition may also contain conventional additives such as mineral fillers, colorants and stabilizers. Mineral fillers that can be included in the composition include talc, $CaCO_3$, silica, such as wollastonite ($CaSiO_3$), clays, diatomaceaous earth, titanium oxide and zeolites. Typically the mineral filler is in particle form having an average diameter ranging form 0.1 to 5 micrometers.

The present invention also provides final articles, such as bumpers, made of the said polyolefin composition.

The particulars are given in the following examples, which are given to illustrate, without limiting, the present invention.

The following analytical methods are used to characterize the polymer compositions.

Melt Flow Rate: ASTM method D 1238, condition L (MFR "L").

Solubility in xylene: 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

[η] intrinsic viscosity: determined in tetrahydronaphtalene at 135° C.

Ethylene and butene-1 content: I.R. Spectroscopy.

Molecular weight (Mw and Mn): determined by the Gel Permeation Chromatography (GPC) method.

Flexural Modulus: ISO method 178.

Tensile stregth at yield: ISO method 527.

Tensile strengh at break: ISO method 527.

Notched IZOD impact test: ISO method 180/1A.

VICAT: ISO method 306.

HDT 1820 KPa: ISO method 75.

Elongation at break and at yield: ISO method 527.

Ductile/Brittle (D/B) transition temperature: Determined according to Basell internal method MTM 17324, available upon request.

Gloss: ASTM method D 2457.

CLTE: this test method is based on ASTM methods D 696 and E831-86. Before the CLTE measurement the sample is conditioned into the TMA (thermomechanical analysis) apparatus at 120° C. for 10 minutes in order to erase the stresses induced into the specimen (3.5 mm thick and 10 mm length) by injection molding. After that the dilatation curve is measured in the temperature range from 0 to 130° C. at 3° C./min scanning rate under the probe, the load of which is 1 mN (flat probe 3.66 mm diameter).

The CLTE measurement is carried out in longitudinal way with respect to the line of injection of the polymer.

CLTE is determined as alpha=$\Delta L/(L°\times \Delta T)$ in the temperature range 23-80° C.

$\Delta L$: length variation in the temperature range from 23 to 80° C.

$\Delta T$: 80–23=57° C.

$L°$: initial specimen length.

EXAMPLE 1

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991.

Catalyst System and Prepolymerization Treatment

Before introducing it into the polymerization reactors, the solid catalyst component described above is contacted at –5° C. for 5 minutes with aluminum triethyl (TEAL) and dicyclopentyldimethoxysilane (DCPMS), in a TEAL/DCPMS weight ratio equal to about 4 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization

Into a first gas phase polymerization reactor a polypropylene homopolymer (component 1) is produced by feeding in a continuous and constant flow the prepolymerized catalyst system, hydrogen (used as molecular weight regulator) and propylene in the gas state. Polymerization conditions are shown in Table 1.

The polypropylene homopolymer produced in the first reactor is discharged in a continuous flow and, after having been purged of unreacted monomers, is introduced, in a continuous flow, into a second gas phase reactor, together with quantitatively constant flows of hydrogen, propylene and ethylene in the gas state.

In the second reactor a propylene-ethylene copolymer (copolymer (b) belonging to component (2) is produced. Polymerization conditions, molar ratio of the reactants and composition of the copolymers obtained are shown in Table 1.

The polymer coming from the second reactor is discharged in a continuous flow and, after having been purged of unreacted monomers, is introduced, in a continuous flow, into a third gas phase reactor, together with quantitatively constant flows of hydrogen, ethylene and 1-butene in the gas state.

In the third reactor an ethylene-butene-1 copolymer (copolymer (a) belonging to component (2) is produced. Polymerization conditions, molar ratio of the reactants and composition of the copolymers obtained are shown in Table 1.

The polymer particles exiting the third reactor are subjected to a steam treatment to remove the reactive monomers and volatile substances, and then dried.

Then the polymer particles are introduced in a rotating drum, where they are mixed with 0.05% by weight of paraffin oil ROL/OB 30 (having a density of 0.842 kg/L at 20° C. according to ASTM method D 1298 and flowing point of –10° C. according to ASTM method D 97), 0.15% by weight of Irganox® B 215 (made of about 34% Irganox® 1010 and 66% Irgafos® 168) and 0.05% by weight of calcium stearate.

Then the polymer particles are introduced in a twin screw extruder Berstorff ZE 25 (length/diameter ratio of screws: 33) and extruded under nitrogen atmosphere in the following conditions:
Rotation speed: 250 rpm;
Extruder output: 6-20 kg/hour;
Melt temperature: 200-250° C.

The characteristics relating to this polymer composition, reported in Table 2, are obtained from measurements carried out on the so extruded polymer.

This masterbatch is able to give the same or even better characteristics than the two commercial high impact masterbatches did as well as a lower value of CLTE that gives a higher dimensional stability to the final molded articles.

A masterbatch only based on an ethylene-butene-1 copolymer as elastomeric moiety doesn't succeed in lowering so much the CLTE.

EXAMPLES 2 AND 3

Example 1 is repeated. The polymerization conditions, molar ratio of the reactants and composition of the copolymers obtained are shown in Table 1.

The characteristics relating to these polymer compositions, reported in Table 2, are obtained from measurements carried out on the so extruded polymers.

EXAMPLES 4-6 AND COMPARATIVE EXAMPLES 1-5

The masterbatches of examples 1-3 are evaluated in blend with additional polyolefins and mineral fillers in comparison with blends comprising known masterbatches. The latter have the following compositions:

Masterbatch A consisting of
  44.2 wt % of a propylene homopolymer with MFR "L" of 90 g/10 min, and
  55.8 wt % of an ethylene/propylene copolymer containing 49 wt % of ethylene and having an intrinsic viscosity of the moiety soluble in xylene of 3.35 dL/g.
The whole composition has an MFR "L" value of 2.7 g/10 min and a flexural modulus value of 400 MPa.

Masterbatch B consisting of
  30 wt % of a propylene homopolymer with MFR "L" of 140 g/10 min;
  30 wt % of an ethylene/propylene copolymer containing 34 wt % of ethylene and having an intrinsic viscosity of the moiety soluble in xylene of 2.45 dL/g; and
  40 wt % of an ethylene/propylene copolymer containing 70 wt % of ethylene and having an intrinsic viscosity of the moiety soluble in xylene of 2.95 dL/g.
The whole composition has an MFR "L" value of 2.8 g/10 min, an intrinsic viscosity of the moiety soluble in xylene of 2.7 dL/g and a flexural modulus value of 400 MPa.

Mastrebatch C consisting of
  18 wt % of a propylene homopolymer with MFR "L" of 105 g/10 min, and
  82 wt % of an ethylene/butene-1 copolymer containing 75 wt % of ethylene and having an intrinsic viscosity of the moiety soluble in xylene of 2.40 dL/g.

The whole composition has an MFR "L" value of 0.6 g/10 min and a flexural modulus value of 150 MPa.

The additional polymers used in the examples and comparative examples are as follows:

Polymer I consisting of
  83 wt % of a propylene homopolymer with MFR "L" of 22 g/10 min, and
  17 wt % of an ethylene/propylene copolymer containing 50 wt % of ethylene and having an intrinsic viscosity of the moiety soluble in xylene of 2.7 dL/g.
The whole composition has an MFR "L" value of 12 g/10 min and a flexural modulus value of 1450 MPa.

Polymer II consisting of
  84 wt % of a propylene homopolymer with MFR "L" of 86 g/10 min, and
  16 wt % of an ethylene/propylene copolymer containing 50 wt % of ethylene and having an intrinsic viscosity of the moiety soluble in xylene of 2.25 dL/g.
The whole composition has an MFR "L" value of 43 g/10 min and a flexural modulus value of 1450 MPa.

Polymer III consisting of
  91 wt % of a propylene homopolymer with MFR "L" of 134 g/10 min, and
  9 wt % of an ethylene/propylene copolymer containing 55 wt % of ethylene and having an intrinsic viscosity of the moiety soluble in xylene of 1.5 dL/g.
The whole composition has an MFR "L" value of 100 g/10 min and a flexural modulus value of 1500 MPa.

Polymer IV consisting of
  87 wt % of a propylene homopolymer with MFR "L" of 180 g/10 min, and
  13 wt % of an ethylene/propylene copolymer containing 60 wt % of ethylene and having an intrinsic viscosity of the moiety soluble in xylene of 1.5 dL/g.
The whole composition has an MFR "L" value of 100 g/10 min and a flexural modulus value of 1500 MPa.

The results of the comparison, reported in Tables 3 and 4, point out the promising properties imparted by the masterbatches according to the present invention to the compounds.

Table 4 reports a comparison between a masterbatch only based on a ethylene/butene-1 rubber and a commercial masterbatch in blends similar to the ones reported in table 3. In the comparative compounds no advantage in terms of CLTE and mechanical characteristics have been obtained.

The masterbatches according to the present invention are able to give the same or even better characteristics than the commercial high impact masterbatch did as well as a lower value of CLTE that gives a higher dimensional stability to the final molded articles.

TABLE 1

|  | Units | Examples | | |
|---|---|---|---|---|
|  |  | 1 | 2 | 3 |
| TEA/donor weight ratio |  | 10 | 4.7 | 4.8 |
| TEA/catalyst weight ratio |  | 10 | 4.9 | 4.8 |
| 1° Reactor (Homopolypropylene) | | | | |
| Split | wt % | 36 | 36 | 34 |
| Temperature | ° C. | 80 | 70 | 70 |
| Pressure | MPa | 2.0 | 1.6 | 1.6 |
| $H_2/C_3^-$ | mol | 0.08 | 0.12 | 0.13 |
| MFR "L" | g/10 min | 82.5 | 74.5 | 79.0 |
| Total Xylene Soluble (X.S.) | wt % | 2.2 | 1.9 | 2.2 |
| Bulk poured density | g/cc | 0.30 | 0.31 | 0.30 |

TABLE 1-continued

|  | Units | Examples | | |
|---|---|---|---|---|
|  |  | 1 | 2 | 3 |
| 2° Reactor (Ethylene-propylene copolymer rubber, EPR) | | | | |
| Split | wt % | 34 | 35 | 37 |
| Temperature | ° C. | 65 | 60 | 60 |
| Pressure | MPa | 1.8 | 1.8 | 1.8 |
| $H_2/C_3^-$ | mol | 0.07 | 0.08 | 0.07 |
| $H_2/C_2^-$ | mol | 0.10 | 0.17 | 0.24 |
| $C_2^-/(C_2^- + C_3^-)$ | mol | 0.32 | 0.32 | 0.22 |
| Ethylene in EPR | wt % | 45 | 46 | 36 |
| Xylene soluble of EPR | wt % | 87 | 86 | 90 |
| MFR "L" | g/10 min | 7.9 | 7.2 | 6.1 |
| Total xylene soluble | wt % | 43.2 | 43.3 | 47.6 |
| Ethylene content | wt % | 21.8 | 22.6 | 18.8 |
| X.S. I.V. | dL/g | 2.91 | 2.85 | 2.65 |
| 3° Reactor (Ethylene-butene-1 copolymer rubber, EBR) | | | | |
| Temperature | ° C. | 70 | 70 | 70 |
| Pressure | MPa | 1.4 | 1.4 | 1.4 |
| Split | wt % | 30 | 29 | 29 |
| $H_2^-/C_2^-$ | mol | 0.22 | 0.22 | 0.21 |
| $C_4^-/(C_2^- + C_4^-)$ | mol | 0.48 | 0.48 | 0.48 |
| Butene-1 in EBR | wt % | 25 | 25 | 25 |
| Xylene soluble of EBR | wt % | — | 46 | 49 |
| X.S. I.V. of EBR | dL/g | 2.6 | 2.65 | 2.89 |
| Total Composition | | | | |
| MFR "L" | g/10 min | 4.0 | 2.3 | 2.8 |
| Total xylene soluble | wt % | 44.3 | 44.0 | 48.0 |
| Ethylene content | wt % | 37.9 | 37.9 | 35.3 |
| Butene-1 content | wt % | 7.6 | 7.2 | 7.2 |
| $I.V._{EPR}/I.V._{EBR}$ ratio |  | 1.12 | 1.07 | 0.92 |
| X.S. I.V. | dL/g | 2.81 | 2.79 | 2.72 |

TABLE 2

| Properties | Units | Examples | | |
|---|---|---|---|---|
|  |  | 1 | 2 | 3 |
| MFR "L" | g/10 min | 4.0 | 2.3 | 2.8 |
| Flexural modulus | MPa | 390 | 255 | 220 |
| Tensile strength at yield | MPa | 9.3 | 7.6 | 7.5 |
| Elongation at yield | % | 33.4 | 36.5 | 60.0 |
| Tensile strength at break | MPa | 13.1 | 11.1 | 10.0 |
| Elongation at break | % | 460 | 415 | 330 |
| Izod at −40° C. | kJ/m² | N.B. | N.B. | N.B. |
| Izod at −50° C. | kJ/m² | 80% N.B. | N.B. | N.B. |
| Gloss 60° on 1 mm thick plaque | % | 51.2 | 88.2 | 86.2 |
| Longitudinal shrinkage | % | — | 0.54 | 0.68 |
| Transversal shrinkage | % | — | 0.58 | 0.70 |
| Longitudinal CLTE | $° C.^{-1} × 10^{-5}$ | 8.8 | 8.7 | 10.1 |

N.B.: not broken

TABLE 3

| Components and properties | Comparative examples | | Examples | | |
|---|---|---|---|---|---|
|  | 2 | 3 | 4 | 5 | 6 |
| Masterbatch A wt % | 47.00 | — | — | — | — |
| Masterbatch B wt % | — | 34.00 | — | — | — |
| Masterbatch of example 1 wt % | — | — | 38.5 | — | — |
| Masterbatch of example 2 wt % | — | — | — | 38.50 | — |
| Masterbatch of example 3 wt % | — | — | — | — | 37.30 |
| Polymer I wt % | — | 20.00 | 29.87 | 19.87 | 21.57 |
| Polymer II wt % | 13.50 | 20.00 | 5.50 | 15.5 | 15.00 |
| Polymer IV wt % | 13.50 | — | — | — | — |
| Talc IMI | 22.00 | 22.00 | 22.00 | 22.00 | 22.00 |
| HM-05 ® wt % | | | | | |
| Additives wt % | 4.00 | 4.00 | 4.13 | 4.13 | 4.13 |
| MFR "L" g/10 min | 6.0 | 5.9 | 5.3 | 5.7 | 6.1 |
| Flexural modulus MPa | 1592 | 1538 | 1657 | 1610 | 1610 |
| Tensile strength at yield MPa | 15.1 | 16.2 | 17.2 | 16.1 | 16.0 |
| Elongation at yield % | 3.0 | — | — | 4.6 | 4.6 |
| Tensile strength at break MPa | 12.2 | 12.6 | 13.6 | 12.7 | 13.6 |
| Elongation at break % | 42 | 129 | 91 | 120 | 340 |
| Vicat 5 kg ° C. | 41.0 | — | — | 45.9 | 48.1 |
| HDT 1820 kPa ° C. | 52 | — | — | 50 | 53 |
| Izod at 23° C. kJ/m² | 48.4 N.B. | 49.3 N.B. | 54.0 N.B. | 55.3 N.B. | 54.4 N.B. |
| Izod at 0° C. kJ/m² | 29.6 | 37.7 N.B. | 38.5 N.B. | 45.6 N.B. | 41.2 N.B. |
| Izod at −20° C. kJ/m² | 10.4 | 8.7 | 9.6 | 14.8 | 10.3 |
| Izod at −30° C. kJ/m² | 9.3 | — | — | 8.9 | 7.1 |
| D/B transition temperature ° C. | −49 | −45.9 | <−50.0 | −55 | −49 |
| Gloss 60° on plaque % | 13.2 | 20.5 | 17.1 | 25.1 | 33.8 |
| Longitudinal CLTE $° C.^{-1} × 10^{-5}$ | 8.7 | 8.1 | 6.6 | 7.3 | 8.4 |
| Longitudinal shrinkage % | 0.82 | — | — | 0.69 | 0.76 |
| Transversal shrinkage % | 1.00 | — | — | 0.88 | 0.93 |
| Total rubber wt % | 30.6 | 30.6 | 30.6 | 30.6 | 30.8 |
| Rubber coming from masterbatch wt % | 26.3 | 23.8 | 24.6 | 24.6 | 24.6 |

TABLE 4

| Components and properties | Units | Comparative examples | |
|---|---|---|---|
|  |  | 4 | 5 |
| Masterbatch C | wt % | 37.00 | — |
| Masterbatch B | wt % | — | 37.00 |
| Polymer II | wt % | 13.93 | 25.93 |
| Polymer III | wt % | 23.00 | — |
| Polymer I | wt % | — | 11.00 |
| Talc IMI HM-05 ® | wt % | 22.00 | 22.00 |
| Additives | wt % | 4.07 | 4.07 |
| MFR "L" | g/10 min | 4.0 | 5.3 |
| Flexural modulus | MPa | 1380 | 1360 |
| Tensile strength at yield | MPa | 15.8 | 14.8 |
| Elongation at yield | % | 9.7 | 7.2 |
| Tensile strength at break | MPa | 17.2 | 12.4 |
| Elongation at break | % | 490 | 365 |
| VICAT 5 kg | ° C. | 43 | 39 |
| HDT 1820 kPa | ° C. | 49 | 48 |
| Hardness Rockwell | R | 19 | 14 |
| Izod at 23° C. | kJ/m² | 65.0 N.B. | 60.1 N.B. |
| Izod at 0° C. | kJ/m² | 60.2 N.B. | 57.4 N.B. |
| Izod at −20° C. | kJ/m² | 37.9 | 38.3 |
| D/B transition temperature | ° C. | <−60 | <−60 |
| Gloss 60° (1 mm thick plaque) | % | 23.0 | 34.0 |
| Longitudinal CLTE | $° C.^{-1} × 10^{-5}$ | 5.8 | 6.2 |
| Total rubber | wt % | 34.0 | 32.2 |
| Rubber coming from masterbatch | wt % | 29.6 | 25.9 |

The invention claimed is:

1. A masterbatch composition comprising (percentage by weight):
   1) 10-50% of a crystalline propylene homopolymer;
   2) 50-90% of a blend consisting of:

a) a copolymer (a) of ethylene and 10-40% of at least one $C_4$-$C_{10}$ α-olefin of formula $H_2C$=CHR, where R is a $C_2$-$C_8$ linear or branched alkyl radical; and b) an amorphous copolymer (b) of propylene and ethylene, wherein an ethylene content is from 20-70%, and having an intrinsic viscosity value of a xylene-soluble moiety of from 2.2 to 3.5 dL/g, this value being equal to 0.8 to 1.2 times the intrinsic viscosity value of a xylene-soluble moiety of copolymer (a);

wherein a weight ratio between copolymer (a) and copolymer (b) is from 3/1 to 1/3, and the masterbatch composition comprises a flexural modulus equal to or lower than 700 MPa.

2. The masterbatch composition of claim 1, wherein the ethylene content of copolymer (b) is from over 30 to 60% by weight.

3. The masterbatch composition of claim 1, wherein the weight ratio (a)/(b) is from 2/1 to 1/2.

4. A thermoplastic polyolef in composition containing a masterbatch composition comprising (percentage by weight):
1) 10-50% of a crystalline propylene homopolymer;
2) 50-90% of a blend consisting of:
a) a copolymer (a) of ethylene and 10-40% of at least one $C_4$-$C_{10}$ α-olefin of formula $H_2C$=CHR, where R is a $C_2$-$C_8$ linear or branched alkyl radical; and
b) an amorphous copolymer (b) of propylene and ethylene, wherein an ethylene content is from 20-70%, and having an intrinsic viscosity value of a xylene-soluble moiety of from 2.2 to 3.5 dL/g, this value being equal to 0.8 to 1.2 times the intrinsic viscosity value of a xylene-soluble moiety of copolymer (a);
wherein a weight ratio between copolymer (a) and copolymer (b) is from 3/1 to 1/3, and the masterbatch composition comprises a flexural modulus equal to or lower than 700 MPa.

5. The thermoplastic polyolefin composition of claim 4, wherein a content of the masterbatch composition is up to 60% by weight.

6. The thermoplastic polyolefin composition of claim 4, wherein the masterbatch composition is blended with additional polyolefins.

7. The thermoplastic polyolefin composition of claim 6, wherein the additional polyolefins are selected from propylene homopolymers, random copolymers, and heterophasic copolymers composition.

8. The thermoplastic polyolefin composition of claim 4 also comprising a mineral filler.

9. An automotive part comprising a masterbatch composition comprising (percentage by weight):
1) 10-50% of a crystalline propylene homopolymer;
2) 50-90% of a blend consisting of:
a) a copolymer (a) of ethylene and 10-40% of at least one $C_4$-$C_{10}$ α-olefin of formula $H_2C$=CHR, where R is a $C_2$-$C_8$ linear or branched alkyl radical; and
b) an amorphous copolymer (b) of propylene and ethylene, wherein an ethylene content is from 20-70%, and having an intrinsic viscosity value of a xylene-soluble moiety of from 2.2 to 3.5 dL/g, this value being equal to 0.8 to 1.2 times the intrinsic viscosity value of a xylene-soluble moiety of copolymer (a);
wherein a weight ratio between copolymer (a) and copolymer (b) is from 3/1 to 1/3, and the masterbatch composition comprises a flexural modulus equal to or lower than 700 MPa.

10. A process for preparing a masterbatch composition comprising (percentage by weight):
1) 10-50% of a crystalline propylene homopolymer;
2) 50-90% of a blend consisting of:
a) a copolymer (a) of ethylene and 10-40% of at least one $C_4$-$C_{10}$ α-olefin of formula $H_2C$=CHR, where R is a $C_2$-$C_8$ linear or branched alkyl radical; and
b) an amorphous copolymer (b) of propylene and ethylene, wherein an ethylene content is from 20-70%, and having an intrinsic viscosity value of a xylene-soluble moiety of from 2.2 to 3.5 dL/g, this value being equal to 0.8 to 1.2 times the intrinsic viscosity value of a xylene-soluble moiety of copolymer (a);
wherein a weight ratio between copolymer (a) and copolymer (b) is from 3/1 to 1/3 by a sequential polymerization, comprising at least three sequential steps, wherein components 1) and 2) are prepared in separate subsequent steps, operating in each step, except the first step, in the presence of the polymer formed and the catalyst used in the preceding step, and the masterbatch composition comprises a flexural modulus equal to or lower than 700 MPa.

11. The masterbatch composition of claim 1, wherein component 1) is present in an amount from 20-40% by weight.

12. The masterbatch composition of claim 1, wherein component 2) is present in an amount from 60-80% by weight.

13. The masterbatch composition of claim 1, wherein in component 2), R contains 12-35% of said $C_4$-$C_{10}$ α-olefins.

* * * * *